United States Patent [19]

Howard et al.

[11] Patent Number: 5,112,270
[45] Date of Patent: May 12, 1992

[54] METHOD FOR STUNNING ANIMALS FOR SLAUGHTER

[75] Inventors: Johannes Howard, Bern; Lucie Fuchs, Adlikon, both of Switzerland

[73] Assignee: Roll and Go AG, Stansstad, Switzerland

[21] Appl. No.: 587,728

[22] Filed: Sep. 25, 1990

[30] Foreign Application Priority Data

Oct. 7, 1989 [CH] Switzerland ................. 3665/89

[51] Int. Cl.$^5$ .................................................. A22B 3/00
[52] U.S. Cl. .......................................... 452/66; 452/57; 452/62
[58] Field of Search ................. 452/62, 66, 57, 65

[56] References Cited

U.S. PATENT DOCUMENTS 3,127,836 4/1964 Silva ........................ 452/57
3,579,889 5/1971 Pallich ...................... 452/62
4,219,905 9/1980 Thacker .................... 452/57

FOREIGN PATENT DOCUMENTS 3602949 8/1987 Fed. Rep. of Germany ........ 452/62

Primary Examiner—Willis Little
Attorney, Agent, or Firm—Walter C. Farley

[57] ABSTRACT

Animals for slaughter are effectively stunned by injecting or a liquid or gaseous medium in the vicinity of the neurocranium within fractions of a second. Injection takes place under high pressure and for a short time. Undesired metabolic reactions are suppressed. Injection takes place by means of one or more injection nozzles (2). The injection medium preferably contains additives with a disinfecting, cooling or thixotropic, viscous characteristic.

26 Claims, 3 Drawing Sheets

METHOD FOR STUNNING ANIMALS FOR SLAUGHTER

FIELD OF THE INVENTION

The invention relates to a method and an apparatus for stunning animals for a slaughter.

BACKGROUND OF THE INVENTION

In modern, industrialized abattoirs the animals for slaughter are stunned prior to slaughtering or blood extraction. A good stunning method for the purpose of killing the animal must, from the animal protection and meat hygiene standpoint, bring the animal as rapidly and effectively as possible in to a state in which it loses consciousness and any pain sensation.

Various methods have been used in the past for stunning animals for slaughter. Electric, carbon dioxide and volt firing stunning methods have been widely used. Of late stunning methods are also known, in which the animals for slaughter are exposed to a partial air vacuum, as a result of which stunning or death occurs.

All stunning methods have a negative effect on the meat quality. In the case of stunning by current surges the PSE (pale, soft exudative) or DFD (dark, firm, dry) meat proportion is increased. In addition, there are often bone fractures and muscle bleeding. In addition, high voltages in electric stunning appear to reinforce the spasm tendency. Economic losses in particular result from bleeding, particularly of the shoulder.

Although carbon dioxide stunning does not cause muscle bleeding, petechial bleeding and bone fractures, the meat quality is generally reduced. Thus, e.g. compared with other stunning methods, the catecholamine values in the blood are at the highest levels. If e.g. halothane-positive pigs (proportion in the Federal German Republic up to 60%, in Switzerland below 10%) are stunned with carbon dioxide, then the meat quality is unacceptable and the PSE meat proportion is greatly increased. Both carbon dioxide and partial vacuum stunning methods cause the animals to be agitated for several seconds before stunning occurs.

Towards the end of the last century the first skull-penetrating stunning instruments were introduced, which are based on the principle of direct brain injury. Serious disadvantages of the earliest instruments were removed by the development of the first bolt firing apparatus between 1914 and 1920. This operating principle has been retained, with a few modifications, up to the present day. A bolt is driven by a high velocity propellant charge roughly 10 cm deep into the skull and is then removed. Thus, the bolt does not leave the firing apparatus. In addition, of late bolt firing apparatuses have become known, which are driven with compressed air. In connection therewith additional air enters the brain substance, which increases the injuries. These apparatuses have such serious problems, that they have been unusable in practise. In particular the active energy is too low, so that the stunning effect is inadequate and often subsequent shots are required. In addition, bleeding occurs in the lungs, heart and liver.

A further known skull-penetrating stunning method is shot impact stunning, which has similar disadvantages to bolt firing stunning, together with further inadequacies. For example, in Switzerland this stunning method is not authorized.

An important disadvantage of the bolt firing apparatuses in connection with industrial use is that only a limited number of animals can be shot per unit of time, so that this method is only used for large animals. Bolt firing apparatuses are only used in the case of small-scale slaughtering of pigs. In addition, the bolt firing stunning method leads to an increased proportion of light, watery meat. The bolt firing method is also problematical because the animals for slaughter and in particular pigs exhibit a terrified behaviour. This makes aiming and firing accuracy difficult, so that stunning is unreliable.

All conventional stunning methods have serious disadvantages and compromises.

SUMMARY OF THE INVENTION

An object of the invention is to provide a method and an apparatus ensuring that the animals for slaughter are stunned as rapidly and effectively as possible, that they do not observe the stunning process and that the meat quality is not negatively influenced, the method being economic, fully automatic and usable with a short repetition time, while not consituting a source of danger for the operating personnel. A further object of the invention is to provide a method and an apparatus which permits the stunning of both large and small animals for slaughter.

Briefly described, the method of the present invention includes forming a stream or jet of fluid under high pressure and directing the fluid jet at the skull of an animal so that the jet penetrates the skull and deactivates the animal. The apparatus of the invention includes a nozzle apparatus, a pressure accumulator for accumulating a fluid under pressure and a control by which the fluid is released to the nozzle to form a jet which is directed at the head of an animal to be stunned.

BRIEF DESCRIPTION OF THE DRAWINGS

The method of the invention and an embodiment of the apparatus are described in greater detail hereinafter relative to the drawings, wherein.

DESCRIPTION OF THE PREFERRED EMBODIMENTS

The inventive idea is based on injecting a liquid or gaseous medium into the skull of the animal. The aim is inter alia to increase the pressure within the skull to such an extent that the reticular formation, basal ganglions and thalamus/hypothalamus are put out of operation. Thus, the invention completely leaves the previously adopted procedure of firing a solid body into the calvaria. The aim is in particular to ensure that the animal is completely relaxed and that the method acts instantaneously.

The method is described hereinafter relative to the medium water. It must be borne in mind that other liquid or gaseous substances can be used in the same way, whilst taking account of any specific characteristics thereof in connection with the method or the construction of the apparatus.

On the basis of this principle the method must be simply and very safely and reliably usable. Particular account must be taken of the special points resulting from industrial stunning and blood extraction. It is in particular required that the apparatus is as simple as possible and that no prior treatment of the skull or calvaria is required. Tests have shown that it is possible with such an injection to penetrate the skin and calvaria and bring about the desired effect in planned manner within the skull.

Under high pressure the medium, in the present case water, is injected into the skull in the vicinity of the neurocranium. Under subsequently specified conditions (working pressure, time, injection medium), it is possible to ensure that the injection point can be at virtually any random location in this area. The vital parts of the brain are not destroyed or deformed. The actual jet penetration point is not of vital significance for the method. However, a preferred injection point is around the center of the medials.

Compared with conventional methods it leads to a more reliable stunning and there are no undesired metabolic reactions. An important difference compared with the bolt firing method is that a high energy density is specifically applied. The brain injuries brought about through the injection of the injection medium are much less marked than with bolt firing stunning. The effect is so marked that within fractions of a second it can be expected that all sensations and perception will be lost.

Figure 1:
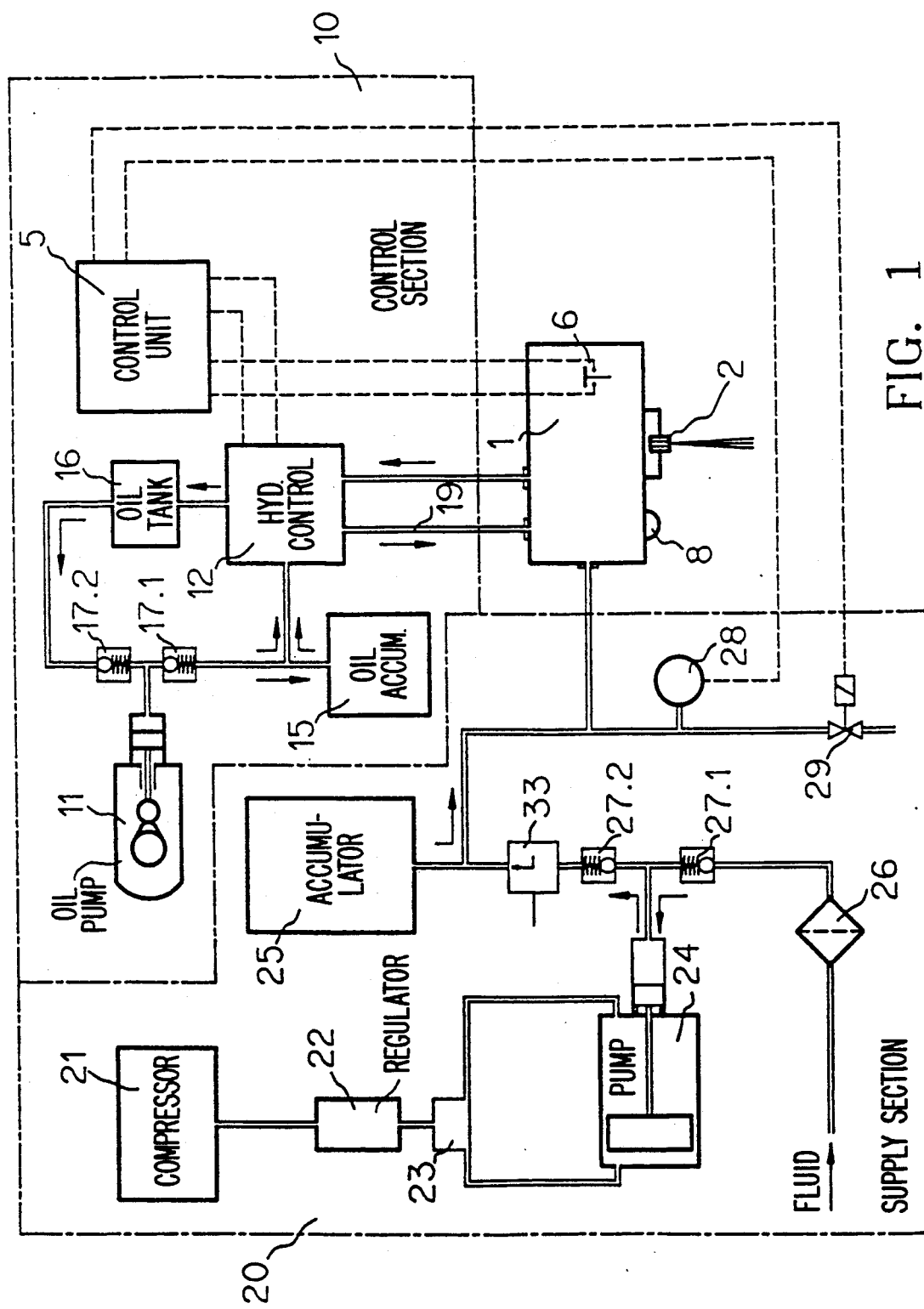
FIG. 1 is a basic schematic diagram of an embodiment of the inventive apparatus.

FIG. 1 shows a basic diagram of an embodiment of the apparatus for performing the inventive method. A nozzle head 1 with an injection nozzle 2 is connected to a supply part 20. The nozzle head 1 is also connected to a hydraulic and control part 10. The supply part 20 is used for building up and storing the pressure of the injection medium used (water). For this purpose a compressor 21 is provided, which operates a reciprocating pump 24 via a pressure regulator 22 and a compressed air control 23. The reciprocating pump is used for building up the pressure in a water-filled pressure tank or accumulator 25, which serves as the energy accumulator. The water is supplied via a water line and a filter 26. By means of two one-way valves 27.1, 27.2, in the conventional manner the water is supplied during a suction stroke to the reciprocating pump and during a working stroke via high pressure lines to the tank 25 or the nozzle head 1. In a special variant an additional pressure regulating valve 33 is connected in the pressure line, which makes it possible to predetermine the pressure for the injection. The supply part also has a pressure monitoring unit 28 and a drain cock 29, which are connected to the control unit 5. This pressure monitoring unit 28 monitors the pressure in operation.

Due to the high pressures which are to be controlled, the nozzle head is controlled by means of at least one pressure control or operating valve, which is e.g. operated by oil hydraulics. As the inventive apparatus must have very short operating times at high pressures, the hydraulics must be designed accordingly. The corresponding hydraulic and control part 10 for said pressure control valves contains an oil pump 11 for building up pressure in the oil pressure accumulator 15. The oil is supplied from an oil tank 16, which is integrated into a closed oil circuit. In the oil line are connected two one-way valves 17.1, 17.2, which assist the suction and working stroke of the oil pump. One or more control lines 19 for the pressure control valve or valves are operated by an electrohydraulic control device 12. The operating or control process is controlled by a control unit 5. The control unit 5 is on the one hand connected to the electrohydraulic control device 12 and to on the other hand to the nozzle head 1. The control device 12 can e.g. comprise at least one solenoid-operated pilot valve, which controls the oil flow through the control line 19. Preferably the control lines are as short as possible in order to ensure high dynamics for the equipment. Thus, in a preferred embodiment, the control device 12 is provided directly in the nozzle head 1. The function of this pilot valve is controlled by the control unit 5. A sensor 8, which is preferably fitted to the nozzle head, supplies the control unit 5 with a "release" signal, as soon as the animal skull is in the injection position. A release button 6 connected to the control head unit is located on the nozzle head 1.

Figure 2:
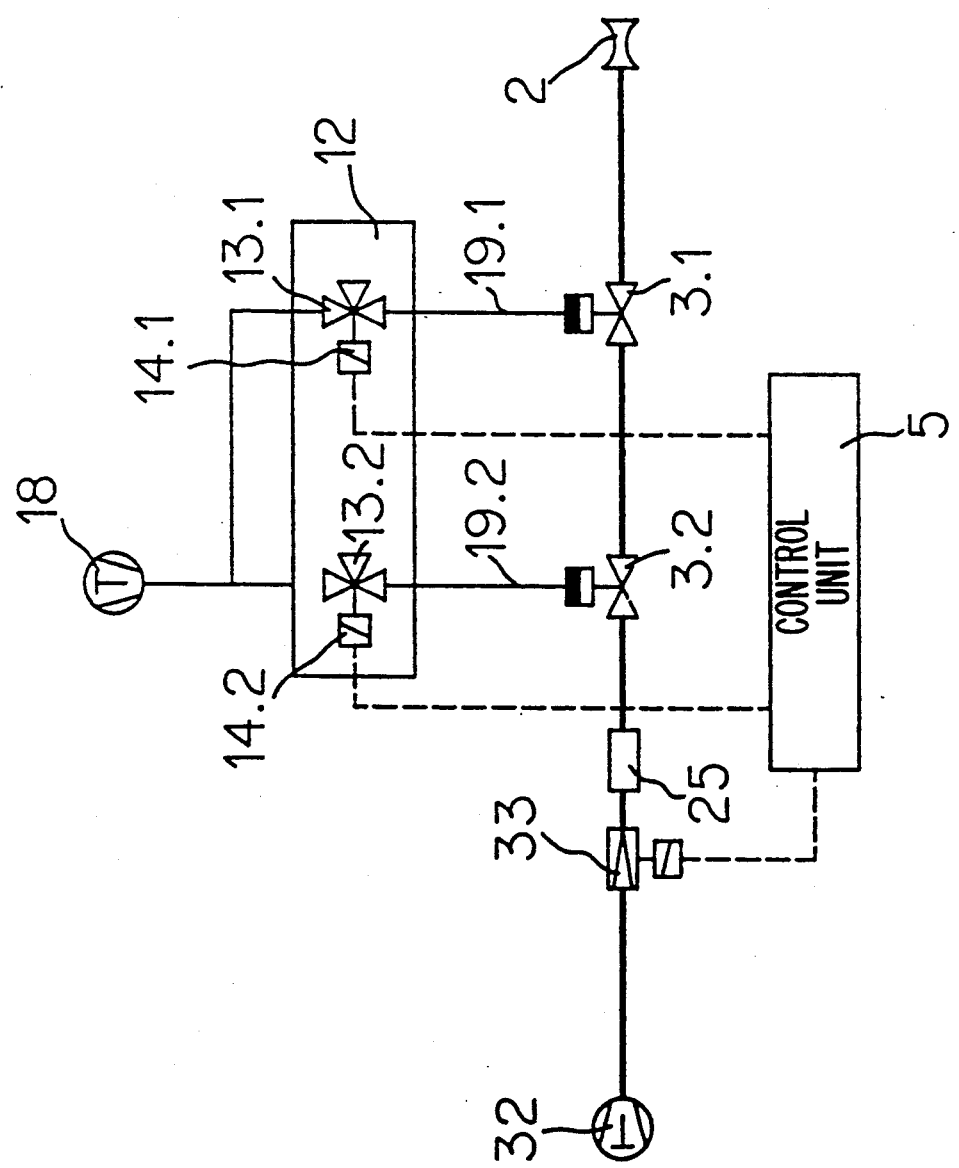
FIG. 2 is an embodiment for the control of the injection nozzle.

FIG. 2 shows in greater detail the control of the injection nozzle 2 or that of the injection process by means of the control unit 5. The circuits for the oil and the injection medium are only indicated diagrammatically. In particular the closed oil circuit is only partly shown and the return lines are completely omitted. The pressure source 18 for the oil and the pressure source 32 for the injection medium are diagrammatically indicated.

The injection nozzle 2 is activated for a short time $\Delta t$. This can either take place through a rapidly operating pilot valve or preferably two pressure control valves 3.1, 3.2 are connected in series. In this case the electrohydraulic control device 2 has two corresponding pilot valves (e.g. three-way valves) 13.1 and 13.2 with two electromagnets 14.1, 14.2. Two associated control lines 19.1, 19.2 are supplied to the two pressure control valves 3.1, 3.2. On initiating the injection the first valve 3.1 is closed and the second valve 3.2 open. If the first pressure control valve 3.1 is now opened and in this way injections is started, then with the corresponding time delay $\Delta t$ the second pressure control valve 3.2 is already closed again. Thus, for a predetermined time $\Delta t$, the injection medium is injected in a clearly defined quantity.

The control unit 5 is used for predetermining and controlling the injection process. Simultaneously through said control unit safety measures can be provided or the injection process monitored. By means of a conventional electronic control the injection time is set and by corresponding pulses the solenoid-controlled valves 13.1, 13.2 of the oil hydraulics are operated. The latter valves of the electrohydraulic control device 12 take over the opening or closing of the output in the control lines 19.1, 19.2, which in turn operate the pressure control valves 3.1, 3.2. The proposed combination of an electrohydraulic control of the injection process takes optimum account of the necessary conditions (high pressures, very short operating times, high repetition frequency). It is obvious that the inventive concept is not restricted by this embodiment.

Preferably the control unit 5 is also connected to the pressure regulating valve 33, so that by means of said control unit, as required, the operating pressure for the injection can be predetermined.

The injection time $\Delta t$ of the jet is controlled in such a way that the action time is only milliseconds. An injection time of $\Delta t = 50$–$100$ msec has proved advantageous for the stunning action. Extensive cutting is limited by higher control pressures and therefore shorter injection times. A shorter injection time can also be brought about by an injection medium having a cooling action.

The pressure of the water jet is approximately 3,500 to 4,000 bar. However, the method is obviously also usable with higher or lower pressures. However, at low pressures the stunning action is not guaranteed in the case of larger animals for slaughter, e.g. pigs and for higher operating pressures the skull is excessively damaged. Considerable significance is also attached to the diameter of the jet, which is preferably approximately 1-2 mm. Correspondingly a nozzle with a diameter of approximately 1-1.5 mm is used. For small animals such as hens, nozzles with a smaller diameter are used. The pressure lines are adapted to the necessary exit pressure. It must be ensured that the pressure accumulators are sufficiently large to enable the pressure to kept constant throughout the injection times $\Delta t$. Preferably a pressure accumulator of at least 1,500 ml is used for the injection medium. The control pressure is preferably above 500 bar. During injection, the injection nozzle is either directly applied to the skull, or is kept at a few centimeters therefrom.

The injection nozzle is preferably interchangeable. The use of two or more injection nozzles, which are slightly reciprocally displaced can also ensure a good action. In a special embodiment the nozzles are reciprocally displaced by an angle, particularly in skew form, so that the injection jets follow different paths in the skull, so that even in the case of imprecise application of the nozzle head a reliable effect is obtained. This in particular leads to a clearly defined turbulance of the injection flows and therefore the brain substance. In other words through the injection of the injection medium turbulant movements or pressure effects are caused within the skull, which are defined by the arrangement of the nozzle or nozzles. An additional possibility is to have a time stagger for the nozzle, or in the case of several nozzles being used, i.e. two or more injection surges follow quickly after one another.

In order to prevent an undesired initiating of the injection process, preferably one or more sensors 8 are located in the vicinity of the injection nozzle 2. These sensors establish whether an object is in the vicinity of the nozzle head 1 and only supply the control unit 5 with a release signal when this is the case. This ensures that the apparatus does not fire into empty space. Obviously further sensors can monitor the injection process on the basis of other criteria.

The injection process will now be described. Prior to the injection of the injection medium the injection point and the area around it is preferably cooled, e.g. by fitting a cap and using a cold spray. In addition, the injection time and the necessary working pressure are set.

As the next stage the nozzle head 1 is applied to the skull or in the vicinity of the medials. The sensor 8 on the nozzle head 1 or additional sensors supply their data to the control unit 5. As a function of the sphere of use, the sensors determine the positioning of the nozzle head, the fulfilling of the safety regulations, the time barrier prior to a second release, etc. This is particularly important when the method is automated. As a result it is possible to satisfy the necessary safety regulations and prevent an undesired operation of the apparatus. As a function of the data supplied by the sensors, the control unit only enables the apparatus to be operated under specific, predetermined conditions. After the nozzle head 1 has been correctly engaged, the release button 6 is operated by the operator or fully automatically in automated processes. The release command is recorded by the control electronics 5. If the further conditions or control parameters are fulfilled (safety conditions, correct positioning, oil pressure readiness, etc), then the control unit 5 releases the electrohydraulic control and therefore the injection jet at a predetermined pressure for the selected time $\Delta t$.

As has been stated hereinbefore, besides liquid injection media, it is also possible to inject substances which are gaseous at ambient temperature under high pressure in the liquid or also gaseous aggregate state. This leads to the advantage that the injected gas exerts an additional cooling action in the case of heat-absorbing expansion, so that the nerve tracts are "stopped" by the action of the cold and in part by local pressure action and if said effect is combined with the stunning action of a pure water jet it can e.g. even dominate the same. An additional possibility is to use substance mixtures, i.e. to admix substances to bring about a disinfecting action. For example, the following mixtures can be used: hydrogen, oxygen and fluorine; hydrogen, oxygen and $SO_2$; gaseous $CO_2$; $N_2$ and chlorine or aqueous solutions with bactericidal substances sprayed into the gas flow. It is also possible to use additives, which e.g. reduce the surface tension of water, so that the propellant medium can pass into an aerosol phase and the active jet is gaseous/liquid on striking the tissue. The high kinetic energy in the active jet also produces frictional forces in the ambient medium. Thixotropic media per se and also the admixing thereof make it possible to operate with a lower kinetic energy and lower friction, so that the destruction of the surrounding tissue can be reduced. Such substances can also be admixed with a liquid fluid after passing out of the pressure nozzle and simultaneously gases can be introduced as an additional fluid.

Figure 3:
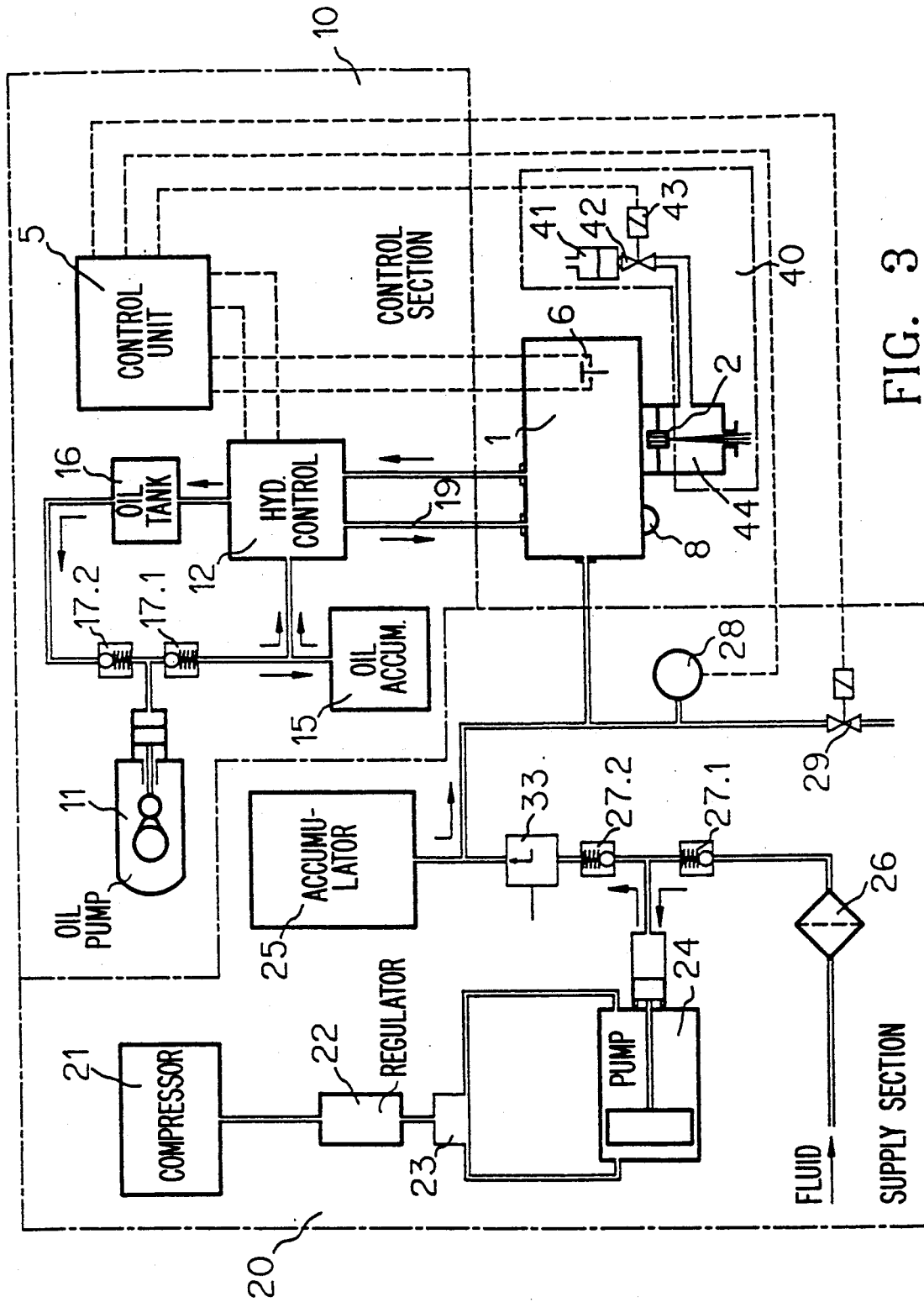
FIG. 3 is an embodiment of the inventive apparatus with an admixing and dosing device.

FIG. 3 diagrammatically shows a variant of the apparatus according to FIG. 1 particularly suitable for the admixing of additional substances, particularly gases. An admixing or dosing device 40 is connected to or integrated into a nozzle head 2. A substance reservoir 41 contains a liquid (liquid mixture) or a gas (gaseous mixture). The partial vacuum brought about by the injection nozzle 1 in a mixing chamber 44 ensures that on opening a control valve 42 the liquid or gas is entrained by the injection jet from the substance reservoir 41. The control valve 42 is e.g. controlled by an electromagnet 43 connected to the control unit 5.

The admixing of an additional substance from the substance reservoir 41 with the injection medium offers several possibilities. In a first use of the inventive method with a liquid injection medium, e.g. water is admixed an additional liquid or a gas, e.g. with a disinfecting action. According to another variant a liquid, i.e. a liquid additional medium is admixed with a gaseous injection medium. The atomizing effect on the liquid in the mixing chamber ensures that very small, entrained liquid droplets assist the penetrating action of the gas jet as a result of their kinetic energy, which is higher than that of an accelerated gas molecule. If the admixed liquid has such a low boiling point that it is gaseous at body temperature, the cooling and expansion action at the target point, i.e. in this case the nerves, ensures a substantially immediate stunning effect.

As stated, fluid additives can, if desired, improve the localization of the effect. The defocussing or deflection of the active jet mainly occurs after striking soft and not hard tissue. Thus, additives, which reduce the molecular friction in the case of high shear, i.e. thixotropic, viscous substances are able to improve the penetrating action through soft tissue, so that any deflection of the active jet is reduced long before it reaches the target. Thus, this measure clearly differentiates between having to penetrate hard materials, in this case the bones of the calvaria, and the specific penetration of soft materials, inter alia the scalp. A more marked deflection of the active jet in the vicinity of the scalp leads to a more laminar destruction of the calvaria than would be the case with a smaller deflection. In the case of a more laminar action the pressure wave in the brain is correspondingly more powerful. Here additional media or even media per se bring about the aim of either preventing such a deflection, or assisting the same.

We claim:

1. A method for stunning an animal for slaughter comprising the steps of
    forming a jet of fluid under high pressure, and
    directing the jet of fluid through the air to the head of an animal so that the jet of fluid penetrates the skull and liquifies brain substance within the skull.

2. A method according to claim 1 wherein the fluid in the jet is in a liquid aggregate state.

3. A method according to claim 2 wherein the liquid includes water.

4. A method according to claim 2 wherein the liquid includes liquid nitrogen.

5. A method according to claim 2 wherein the liquid includes liquid carbon dioxide.

6. A method according to claim 1 wherein the fluid in the jet is in a gaseous aggregate state.

7. A method according to claim 6 wherein the gas is carbon dioxide.

8. A method according to claim 1 wherein the jet of fluid is under a pressure of between about 3000 bar and about 4000 bar.

9. A method according to claim 8 and including directing the jet of fluid at the head for an interval of between about 10 and about 200 milli-seconds.

10. A method according to claim 9 and including directing a second jet of fluid at the head a predetermined time after the first jet.

11. A method according to claim 9 and including directing a second jet of fluid at the head at a location spaced from the penetration of the first jet to create turbulence within the skull.

12. A method according to claim 1 and including cooling the penetration location on the head before the step of directing.

13. A method according to claim 1 wherein the jet is formed using a nozzle, the method further comprising mixing an additional fluid medium with the fluid forming the jet after the jet leaves the nozzle.

14. A method according to claim 13 wherein one of the fluid media is a thixotropic substance.

15. A method according to claim 13 wherein one of the fluid media is a disinfectant.

16. An apparatus for stunning an animal for slaughter comprising the combination of
    nozzle means for forming a jet of fluid, said nozzle being orientable so that the jet formed thereby is directed at the head of an animal to be stunned;
    pressure accumulator means coupled to said nozzle for accumulating a fluid under pressure;
    means for releasing and delivering said fluid under pressure from said accumulator means to said nozzle means;
    control means for controlling release of said fluid to said nozzle means to thereby form said jet.

17. An apparatus according to claim 16 wherein said pressure accumulator means has a volume of at least 1500 ml.

18. An apparatus according to claim 17 wherein said control means includes first and second independently controlled valves between said accumulator means and said nozzle means.

19. An apparatus according to claim 16 wherein said control means includes first and second independently controlled valves between said accumulator means and said nozzle means.

20. An apparatus according to claim 19 wherein said control means includes hydraulic means for controlling said valves.

21. An apparatus according to claim 16 and including a plurality of nozzle means coupled to said accumulator means.

22. An apparatus according to claim 21 wherein said nozzle means are mounted at angles to each other.

23. An apparatus according to claim 16 wherein said nozzle means includes a nozzle having an orifice with a diameter of between about 1 mm and about 1.5 mm.

24. An apparatus according to claim 23 wherein said control means is integrated into said nozzle means.

25. An apparatus according to claim 16 and including a mixing chamber between said accumulator means and said nozzle means for mixing an additional fluid medium with a fluid from said accumulator means so that a mixture of fluids forms said jet.

26. A method for stunning an animal for slaughter comprising the steps of
    placing a fluid under high pressure;
    releasing the fluid to an orifice forming a nozzle directed toward the head of the animal to be stunned to thereby form a jet of fluid under high pressure passing through the air to impinge against the head of the animal so that the jet of fluid penetrates the skull without mechanical assistance and liquifies brain substance within the skull, and terminating the flow of fluid to end the jet.

* * * * *